J. BERRY.
Assignor to the NATIONAL NEEDLE Co.
Machine for Polishing the Eyes of Machine-Needles
No. 8,349. Reissued July 23, 1878.
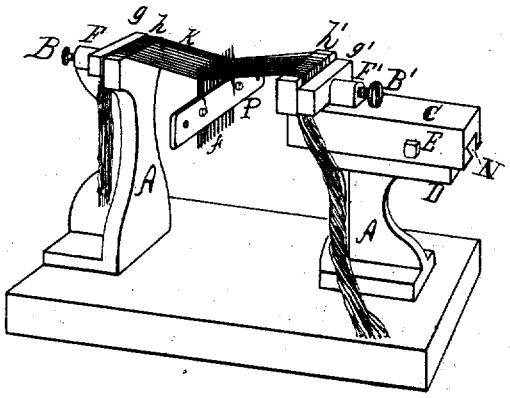
Witnesses
H A Chapin
Wm H Chapin
Inventor
John Berry
N. PETERS, PHOTO-LITHOGRAPHER, WASHINGTON, D. C.

UNITED STATES PATENT OFFICE.

JOHN BERRY, OF SPRINGFIELD, MASSACHUSETTS, ASSIGNOR TO THE NATIONAL NEEDLE COMPANY, OF SAME PLACE.

IMPROVEMENT IN MACHINES FOR POLISHING THE EYES OF MACHINE-NEEDLES.

Specification forming part of Letters Patent No. 165,532, dated July 13, 1875; Reissue No. 8,349, dated July 23, 1878; application filed August 4, 1877.

DIVISION A.

*To all whom it may concern:*

Be it known that I, JOHN BERRY, of Springfield, county of Hampden, and State of Massachusetts, have invented a new and useful Improvement in Machines for Polishing the Eyes of Needles; and I do hereby declare that the following is a full, clear, and exact description thereof, reference being had to the accompanying drawing, making a part of this specification, and to the letters of reference marked thereon.

The drawing shows a perspective view of my machine for holding the threads on which the eyes of the needles are polished, and also shows the polishing-threads attached thereto, on which is threaded a group of needles secured and retained in a clamp, by means of which they are all moved simultaneously for the purpose of polishing the eyes thereof.

My invention relates to a machine for polishing the eyes of sewing-machine needles; and it consists of two uprights or standards, each fixed in a firm position, and each provided at the top with a jaw to grasp and hold the threads upon which a series of needles are strung, the needles being held in a clamp, with the eyes of the needles all in the same relative position, so that when the threads are grasped by the jaws and held fast the whole series of needles may have all the eyes polished at once by seizing the clamp with the hands and moving the needles rapidly to and fro upon the threads, to which emery or other polishing material has been previously applied.

In the drawing, A A are two uprights, which are fixed in a firm position, near the top of one of which is a jaw, *g*, which is moved against the upper end, *h*, of the upright by a screw, B, turned through the threaded part F, or by a cam or other convenient mechanism. The upper end of the other upright is also provided with a jaw, *g'*, moved against the piece *h'* by a screw, B', turned through the threaded part F'; and to facilitate the quick adjustment of longer or shorter threads in the machine, one upright A is provided with a piece, D, upon which slides to and fro a head-block, C, held to the piece D by a dovetail tongue upon the top of piece D and a corresponding groove, N, in the block C; and the latter may be adjusted and clamped in any desired position upon the piece D by the set-screw E, turned into the block C and against the tongue. The piece *h'* and the part F' are both fixed to the block C, with the jaw *g'* operating between.

P is a clamp for holding the needles *f* while being polished, keeping their eyes in one direction.

The operation of my invention is as follows: The polishing-threads *k* having been inserted in the eyes of the needles, and the threads stretched across in an even manner from one upright to the other, and passed over *h* and *h'* down the outside of each, and the jaws *g* and *g'* forced in firmly against the parts *h* and *h'*, grasping and holding the threads, emery or other suitable polishing material is then rubbed upon the threads, and the clamp, with the group of needles therein, is seized with the hands and moved to and fro rapidly a few times, and the eyes of all the needles in the group are thus polished simultaneously.

I am aware that various devices and machines have heretofore been used to polish the eyes of needles; but the inequalities of the threads caused by the polishing material and by the imperfections in spinning cause many of the needles, and of the threads also, to be broken during the operations of the machine, the movements of which are positive, whereas by my device the hands of the operator feel the inequalities and obstructions upon the threads, and give way or yield somewhat to them, allowing the needles to move more slowly in passing over them. This obviates much of the trouble of breaking the needles, and is therefore a great saving; also, fewer threads are broken in the operation of polishing by my device, and consequently a saving in time is effected, as the operator is not required to stop to rethread needles. As the threads are not worn away so fast, they may be used over and over again, and consequently less new thread is required.

What I claim as my invention is—

1. The device for polishing the eyes of needles, consisting of the fixed pieces $h$ and $h'$, the movable jaws $g$ and $g'$, operating, in combination with the pieces $h$ and $h'$, to grasp the threads extending through the series of needles, and the clamp P, for holding the needles firmly in a line with the eyes all in the same relative position, substantially as described.

2. The adjustable head-block C, arranged upon the upright A, in combination with the jaws $g$ and $g'$, operating, in connection with the parts $h$ and $h'$, to grasp and hold the threads upon which the needles are strung, substantially as set forth.

JOHN BERRY.

Witnesses:
H. A. CHAPIN,
WM. H. CHAPIN.